(12) United States Patent
Kashiwaba (10) Patent No.: US 7,603,030 B2
(45) Date of Patent: Oct. 13, 2009

(54) OPTICAL APPARATUS FOR CORRECTING THE MOVEMENT OF A FOCUSING LENS IN ACCORDANCE WITH A CHANGE IN FOCAL LENGTH

(75) Inventor: Seiichi Kashiwaba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 11/243,880

(22) Filed: Oct. 4, 2005

(65) Prior Publication Data

US 2006/0083505 A1    Apr. 20, 2006

(30) Foreign Application Priority Data

Oct. 14, 2004    (JP) ............................. 2004-300378

(51) Int. Cl.
*G03B 17/00* (2006.01)

(52) U.S. Cl. ............................. 396/86; 396/79; 396/85; 396/101; 396/121; 396/529; 359/694; 359/699; 359/700; 359/701

(58) Field of Classification Search .................. 396/79, 396/101, 85, 529, 86, 121; 348/358; 250/201; 359/701
See application file for complete search history.

(56) References Cited

U.S. PATENT DOCUMENTS

| | | | | |
|---|---|---|---|---|
| 3,613,544 A | * | 10/1971 | Plihal et al. | 396/79 |
| 4,002,405 A | * | 1/1977 | Stahl | 359/697 |
| 5,144,490 A | | 9/1992 | Yamanouchi | |
| 5,177,638 A | * | 1/1993 | Emura et al. | 359/704 |
| 5,550,416 A | * | 8/1996 | Fanchang et al. | 310/83 |
| 5,832,318 A | | 11/1998 | Sato et al. | |
| 5,937,215 A | * | 8/1999 | Mogamiya | 396/85 |
| 5,973,857 A | | 10/1999 | Kaneda | |
| 6,046,864 A | * | 4/2000 | Onda | 359/819 |
| 6,141,158 A | | 10/2000 | Kaneda | |
| 6,333,825 B1 | * | 12/2001 | Hamasaki et al. | 359/699 |
| 6,381,076 B1 | * | 4/2002 | Kashiwaba | 359/701 |
| 6,809,884 B2 | * | 10/2004 | Nomura et al. | 359/699 |
| 6,853,507 B2 | * | 2/2005 | Ryu et al. | 359/824 |
| 2006/0045503 A1 | * | 3/2006 | Ishizuka et al. | 396/79 |

FOREIGN PATENT DOCUMENTS

| | | |
|---|---|---|
| JP | 63-314511 A | 12/1988 |
| JP | 3-144411 A | 6/1991 |
| JP | 2001-100080 A | 4/2001 |
| JP | 2001-188161 A | 7/2001 |

* cited by examiner

*Primary Examiner*—Melissa J. Koval
*Assistant Examiner*—Linda B Smith
(74) *Attorney, Agent, or Firm*—Canon U.S.A., Inc. I.P. Division (57) ABSTRACT

An optical apparatus includes a zoom optical system including a focusing lens unit, a first cam member that rotates around the optical axis and moves along the optical axis in a magnification-changing operation, the first cam member including a focus cam portion for driving the focusing lens unit, and a speed-changing mechanism that changes the relative rotational speed between the focusing lens unit and the first cam member in accordance with the focal length of the zoom optical system in the magnification-changing operation. The speed-changing mechanism moves along the optical axis in the magnification-changing operation. In addition, the speed-changing mechanism includes a transmission member that is rotatable around the optical axis with respect to the first cam member and that includes a speed-changing cam portion for changing at least one of the rotational speed and the rotational direction of the focusing lens unit.

9 Claims, 4 Drawing Sheets

OPTICAL APPARATUS FOR CORRECTING THE MOVEMENT OF A FOCUSING LENS IN ACCORDANCE WITH A CHANGE IN FOCAL LENGTH

BACKGROUND OF THE INVENTION

1. Field of the Invention

The present invention relates to zoom lenses, and more particularly, to a lens-driving device used for driving an optical zoom lens called an inner-focus zoom lens or a rear-focus zoom lens.

2. Description of the Related Art

Inner focus (or rear focus) zoom lenses in which a lens unit other than a front lens unit is moved for focusing are known.

In a typical inner focus zoom lens, the size of the overall lens apparatus can be reduced by reducing the diameter of the front lens unit at the object side. In addition, the speed of autofocus (hereafter abbreviated as AF) can be increased by reducing the weight of a focusing lens. In addition, the hood effect and the operability of a filter can be improved by using a non-rotating front lens unit.

In general, in an inner focus zoom lens, the amount of movement of the focusing lens must be varied in accordance with the change in the focal length occurring in a magnification-changing operation. Accordingly, as described in, for example, Japanese Patent No. 2561350, the amount of movement of the focusing lens is automatically corrected in accordance with the change in the focal length.

However, corresponding to an increase in the zoom magnification, new problems have arisen. In a typical inner focus zoom lens, when the object distance is constant, the amount of movement of the focusing lens gradually increases from the wide-angle end to the telephoto end. In particular, in high-magnification zoom lenses (zoom lenses with a magnification of 5× or more), the amount of movement of the focusing lens differs greatly between the wide-angle end and the telephoto end, and the amount of movement rapidly increases as the zoom position approaches the telephoto end.

When a method disclosed in the above-mentioned Japanese Patent No. 2561350 is applied to a high-magnification zoom lens having such characteristics, the amount of zoom parameter shift caused by the optimization of a focus cam (to achieve a single, smooth cam by combining the movement trajectories of the focusing lens at different focal lengths) is increased. Therefore, the inclination of the movement trajectory of the zoom lens differs greatly between the wide-angle end and the telephoto end. This causes an operability problem that the operating torque increases or rapidly changes in the magnification-changing operation or a problem that a change in focus that is out of the allowable range must be tolerated in the magnification-changing operation.

Accordingly, there are demands for lens-driving methods for sufficiently reducing the change in focus in the magnification-changing operation without degrading the operability in the magnification-changing operation. For example, according to Japanese Patent Laid-Open No. 2001-188161, the engagement position and the engagement range of a focus driving cam and a follower provided on a focusing lens at each focal length are corrected by changing the moving speed of the engagement position of the focus driving cam and the follower in accordance with the focal length.

According to the technique disclosed in the above-mentioned Japanese Patent Laid-Open No. 2001-188161, a speed-changing mechanism is used for changing the moving speed of the engagement position of the focus driving cam and the follower provided on the focusing lens in accordance with the focal length. The speed-changing mechanism includes a focus driving member having a key groove that engages with a key follower provided on the focusing lens and that is formed in a non-straight cam shape such that at least a portion of the key groove is not parallel to the optical axis. The focus driving member rotates the focusing lens in the focusing operation due to the engagement between the key groove and the key follower.

The focus driving member included in the speed-changing mechanism does not move along the optical axis. Therefore, in the case in which the movement trajectory of the focusing lens in the magnification-changing operation passes through the same position along the optical axis a plurality of times, the moving speed of the engagement position of the focus driving cam and the follower provided on the focusing lens must be the same at all such positions. Therefore, it is difficult to smoothly correct the engagement position and the engagement range of the focus driving cam and the follower provided on the focusing lens at each focal length.

SUMMARY OF THE INVENTION

The present invention is directed to an optical apparatus which can smoothly and adequately correct the movement of a focusing lens in accordance with a change in a focal length.

According to one aspect of the present invention, an optical apparatus includes a zoom optical system including a focusing lens unit, a first cam member that rotates around the optical axis and moves along the optical axis in a magnification-changing operation, the first cam member including a focus cam portion for driving the focusing lens unit, and a speed-changing mechanism that changes the relative rotational speed of the focusing lens unit and the first cam member in accordance with the focal length of the zoom optical system in the magnification-changing operation. The speed-changing mechanism moves along the optical axis in the magnification-changing operation. In addition, the speed-changing mechanism includes a transmission member that is rotatable around the optical axis with respect to the first cam member and that includes a speed-changing cam portion for changing at least one of the rotational speed and the rotational direction of the focusing lens unit.

Further features of the present invention will become apparent from the following description of an exemplary embodiment with reference to the attached drawings.

DESCRIPTION OF THE EMBODIMENT

An embodiment of the present invention will be described below with reference to the accompanying drawings.

Figure 1:
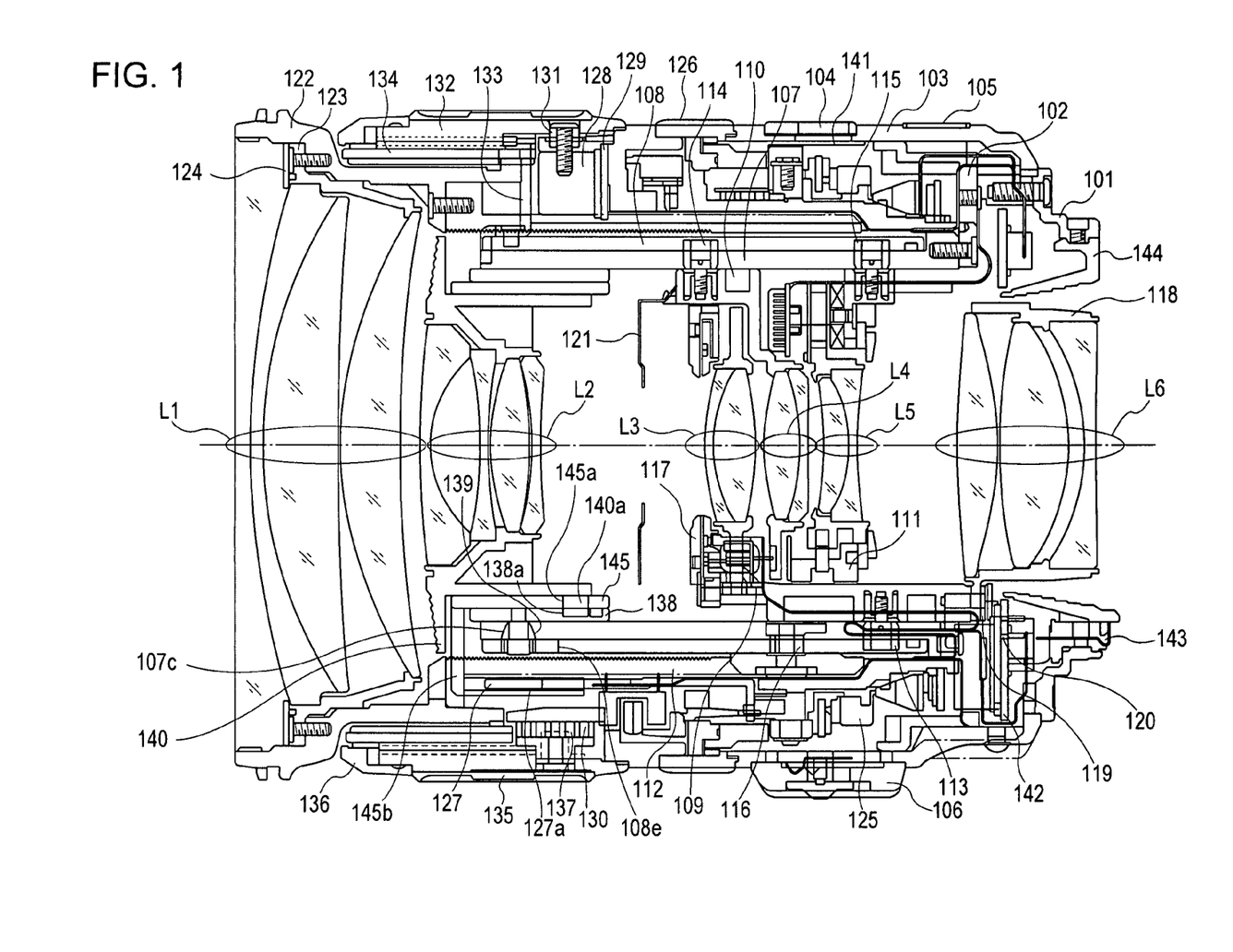
FIG. 1 is a sectional view of an optical apparatus according to an embodiment of the present invention shown at the wide-angle end of its zoom range.
Figure 2:
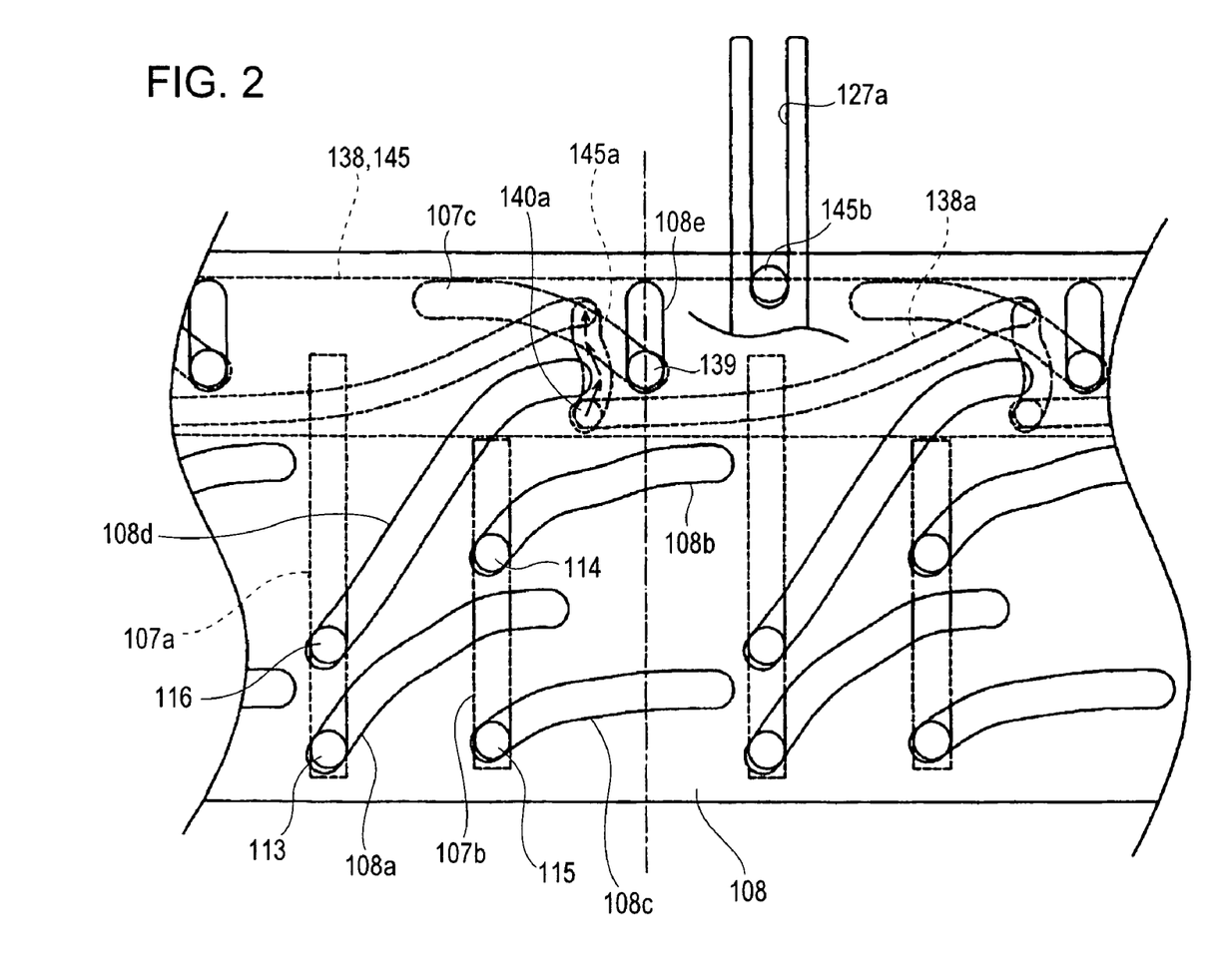
FIG. 2 is a developed view of the optical apparatus according to the embodiment of the present invention at the wide-angle end.
Figure 4:
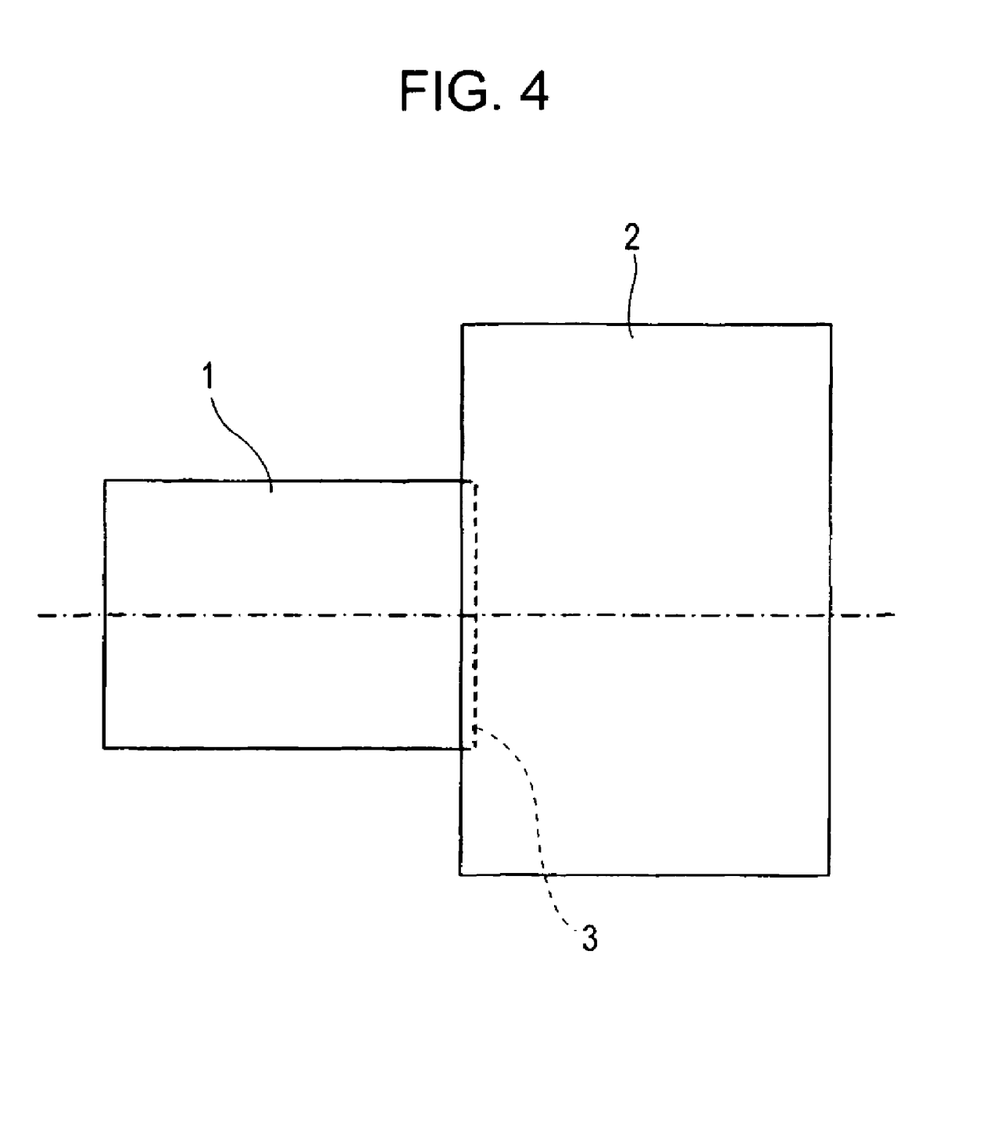
FIG. 4 is an external view of an imaging device including the optical apparatus according to the embodiment of the present invention.

FIG. 4 illustrates the external structure of a single-lens reflex camera (imaging device) including an optical apparatus (lens apparatus) according to an embodiment of the present invention. The camera includes a lens apparatus 1, which functions as an optical apparatus, and a camera body 2 to which the lens apparatus 1 is detachably attached. The lens apparatus 1 is attached to a camera mount 3 by bringing a mount 101 included in the lens apparatus 1 into contact with the camera mount 3. FIG. 1 illustrates the overall structure of the lens apparatus according to the embodiment of the present invention, and FIG. 2 is a developed view of a lens-driving mechanism of the lens apparatus 1 shown in FIG. 1 at the wide-angle end.

The lens apparatus 1 according to the present embodiment has a six-unit structure including six lens units L1 to L6. All the lens units L1 to L6 move along the optical axis in the magnification-changing operation. In addition, the second lens unit L2 moves along the optical axis in the focus adjustment operation. The third and sixth lens units L3 and L6 move together, and the fifth lens unit L5 can move not only along the optical axis but also in a direction perpendicular to the optical axis in a shake correction operation.

A mount 101 having a bayonet portion for attaching the lens apparatus 1 to the camera body 2 is fixed to a fixing tube 102 with screws. An outer member 103 is fixed between the mount 101 and the fixing tube 102, and a scale window 104, a nameplate 105, and a switch (SW) panel 106 are attached to the outer member 103. A switch provided on the SW panel 106 is used for selecting functions, such as an autofocus function and a shake correction function.

The fixing tube 102 is attached to a guide tube 107 with screws, and thus the guide tube 107 serves as a fixed portion relative to the camera body 2. A cam tube 108 is fitted around the guide tube 107 with bayonet connection such that the cam tube 108 can only rotate around the optical axis.

When the cam tube 108 rotates, intersection points between guide grooves 107a and 107b (FIG. 2) formed in the guide tube 107 along the optical axis and zoom cams (variator cam portions) 108a, 108b, 108c, and 108d formed in the cam tube (second cam member) 108 move. Due to the movement of the intersection points, a retaining frame 109 of the third lens unit L3, a retaining frame 110 of the fourth lens unit L4, a shake correction unit 111, and a rectilinear tube 112 are moved along the optical axis by followers 113 to 116 attached with screws.

An electromagnetic diaphragm unit 117 including a diaphragm driver and diaphragm blades is attached to the retaining frame 109 of the third lens unit L3 with screws. In addition, a retaining frame 118 of the sixth lens unit L6 is attached to the rear end of the retaining frame 109 together with a reinforcing plate 119 and a spring washer 120 with screws.

The retaining frame 110 retains the fourth lens unit L4 and has a hook portion at the front end thereof. A moving diaphragm 121 for determining the full aperture and for blocking harmful light is resiliently attached to the hook portion from the front. Accordingly, the moving diaphragm 121 and the retaining frame 110 can be easily attached to each other with the retaining frame 109 interposed therebetween.

The shake correction unit 111 retains the fifth lens unit L5 such that the fifth lens unit L5 can move in a direction substantially perpendicular to the optical axis, and drives the fifth lens unit L5 with a driving mechanism including a magnet and a coil. A filter frame 122 is fixed to the rectilinear tube 112 with screws. A bayonet portion and a screw portion are provided on the outer and inner peripheries, respectively, of the filter frame 122 at the front end thereof, so that accessories such as a hood, a filter, etc., can be attached.

A retaining frame 123 that retains the first lens unit L1 is attached to the filter frame 122 with screws. The abutting surface of the filter frame 122 has a plurality of slope surface portions, and the abutting surface of the retaining frame 123 has a plurality of slope surface portions that are in contact with the slope surface portions of the filter frame 122 in the circumferential direction. Therefore, the installation position of the retaining frame 123 along the optical axis can be changed by rotating the retaining frame 123 before attaching it. Accordingly, the focal point displacement at the wide-angle end and the telephoto end caused by manufacturing tolerances can be corrected.

Indications of the lens name and the like are printed on a front surface of a decorative ring 124. A focusing unit 125 is fixed to the guide tube 107 with screws. The focusing unit 125 mainly includes a vibration motor and a differential mechanism, and outputs an amount of rotation of a focus key (focus driving member) 127 corresponding to an amount of rotation of a rotor included in the vibration motor and an amount of rotation of a manual focusing ring 126.

A gyroscope circuit board 129 is attached to the front of the focusing unit 125 with screws in such a manner that a rubber damper (not shown) is interposed therebetween. A pair of vibration gyroscopes 128 for detecting angular velocities of vibrations in the horizontal and vertical directions are soldered on the gyroscope circuit board 129. In addition, an encoder flexible circuit board 130 on which a Gray code pattern is formed is adhesively secured to the outer periphery of an arc-shaped protrusion extending from the focusing unit 125.

In addition, a protrusion is provided at the front of the focusing unit 125 in a region free from the vibration gyroscopes 128 and the encoder flexible circuit board 130, and a follower 131 is attached to the protrusion with a screw. The follower 131 is engaged with a groove formed in a zoom operation ring 132 along the circumference thereof, so that the zoom operation ring 132 can rotate around the optical axis while the movement thereof along the optical axis is restrained.

The zoom operation ring 132 has a recess in the inner periphery thereof, and a zoom key 133, which is attached to the cam tube 108 with screws, is engaged with the recess. Thus, the cam tube 108 is rotated together with the zoom operation ring 132 by the zoom key 133.

An intermediate tube 134 has a projection on the outer periphery thereof, the projection being engaged with a groove formed in the inner periphery of the zoom operation ring 132 along the optical axis. In addition, the intermediate tube 134 has a lead groove in the inner periphery thereof, the lead groove being engaged with a projection formed on the outer periphery of the filter frame 122. Accordingly, the intermediate tube 134 rotates together with the zoom operation ring 132 and moves along the optical axis in accordance with the rotational position of the zoom operation ring 132 and the position of the filter frame 122 along the optical axis.

In the present embodiment, the vibration gyroscopes 128 are disposed at a position distant from the camera body (in front of the focusing unit 125). Therefore, vibrations of the camera body (vibrations caused by the shutter movement and the up/down movement of a mirror) are not easily transmitted to the vibration gyroscopes 128. Accordingly, unlike the known structure, it is not necessary to place the vibration gyroscopes in a casing or the like.

In addition, the projection for restraining the movement of the zoom operation ring 132 along the optical axis is provided in a region free from the vibration gyroscopes 128 so that the vibration gyroscopes can be arranged without increasing the lens diameter. Accordingly, in the present embodiment, the size of the lens apparatus 1 is reduced.

A zoom rubber 135 is wound around the zoom operation ring 132, and a name ring 136 is resiliently coupled to the zoom operation ring 132 at the front end thereof. A zoom brush 137 is attached to the zoom operation ring 132 with screws. When the zoom operation ring 132 rotates, the zoom brush 137 slides on the Gray code pattern on the encoder flexible circuit board 130 to detect the positional relationship between the zoom operation ring 132 and the encoder flexible circuit board 130.

A follower 139 is attached to an inner cam tube (first cam member) 138 with a screw such that a coil spring is disposed therebetween. The follower 139 is engaged with a zoom correction cam 107c formed in the guide tube 107 and a rectilinear groove 108e formed in the cam tube 108 along the optical axis. Therefore, when the cam tube 108 rotates, the inner cam tube 138 rotates and moves along the optical axis in accordance with the movement of the intersection point between the zoom correction cam 107c and the rectilinear groove 108e (i.e., the engagement position of the follower 139).

A transmission tube (speed-changing mechanism) 145 is engaged with the inner cam tube 138 by a bayonet structure such that the transmission tube 145 can rotate around the optical axis. Accordingly, the transmission tube 145 moves together with the inner cam tube 138 along the optical axis.

In addition, a key portion (key follower) 145b extending from the transmission tube 145 is engaged with a key groove 127a formed in the focus key 127. A retaining frame 140 retains the second lens unit L2. The retaining frame 140 and the second lens unit L2 form a focusing lens unit.

A follower 140a is formed on the outer periphery of the retaining frame 140. The follower 140a is engaged with a focus cam (focus driving cam) 138a formed in the inner periphery of the inner cam tube 138 and a transmission cam 145a (speed-changing cam) that is formed in the transmission tube (speed-changing mechanism) 145 and that has a non-straight shape such that the transmission tube 145 is not parallel to the optical axis.

Accordingly, when the transmission tube 145 rotates, the retaining frame (focusing lens unit) 140 rotates and moves along the optical axis in accordance with the movement of the intersection point between the focus cam 138a and the transmission cam 145a (i.e., the engagement position of the follower 140a). Therefore, when the vibration motor or the manual focusing ring 126 is rotated in the focus adjustment operation and the focus key 127 is rotated accordingly (the cam tube 108 is stopped), the rotation of the focus key 127 is transmitted to the transmission tube 145 by the key portion 145b, thereby rotating the transmission tube 145.

When the transmission tube 145 rotates, the follower 140a on the retaining frame 140 moves in accordance with the movement of the intersection point between the focus cam 138a in the inner cam tube 138 and the transmission cam 145a in the transmission tube 145. Accordingly, the retaining frame (focusing lens unit) 140 rotates and moves along the optical axis.

In the magnification-changing operation, the vibration motor and the manual focusing ring 126 do not rotate. Accordingly, the focus key 127 and the transmission tube 145 do not rotate either. In contrast, the cam tube 108 and the inner cam tube 138 rotate. Therefore, the retaining frame (focusing lens unit) 140 moves along the optical axis by an amount corresponding to the sum of the amount of movement of the inner cam tube 138 along the optical axis, which is due to the rotation of the cam tube 108 and which corresponds to the movement of the intersection point between the zoom correction cam 107c in the guide tube 107 and the rectilinear groove 108e in the cam tube 108, and the amount of movement along the optical axis corresponding to the movement of the intersection point between the focus cam 138a in the inner cam tube 138 and the transmission cam 145a in the transmission tube 145.

When the magnification is changed from the wide-angle end shown in FIG. 2 toward the telephoto end via the middle region, the cam tube 108 and the inner cam tube 138 rotate leftward in FIG. 2. Accordingly, the key portion 145b of the transmission tube 145 moves from the lower end of the key groove 127a, which does not rotate, in the figure to a position near the upper end, and the retaining frame 140 moves upward (frontward along the optical axis).

When the magnification is changed from the telephoto end toward the wide-angle end, the cam tube 108 and the inner cam tube 138 rotate rightward in FIG. 2. Accordingly, the key portion 145b of the transmission tube 145 moves from the upper end of the key groove 127a, which does not rotate, to a position near the lower end, and the focusing lens unit moves downward (rearward along the optical axis).

In the present embodiment, the lower section of the transmission cam 145a (i.e., the engagement range of the follower 140a corresponding to the movable range of the retaining frame 140 in the wide-angle region) is tilted toward the upper right with respect to the optical axis, that is, the vertical direction in the figure. The middle section of the transmission cam 145a (i.e., the engagement range of the follower 140a corresponding to the movable range of the retaining frame 140 in the middle zoom region) is tilted toward the upper left with respect to the optical axis, that is, the vertical direction in the figure. In other words, the transmission cam 145a projects rightward in FIG. 2 in a region corresponding to the wide-angle region and the middle zoom region.

The upper section of the transmission cam 145a (i.e., the engagement range of the follower 140a corresponding to the movable range of the retaining frame 140 in the telephoto region) extends straight along the optical axis, that is, in the vertical direction. Thus, the transmission cam 145a has a non-straight cam shape in which at least a portion thereof is not parallel to the optical axis. Therefore, when the magnification-changing operation is performed in the telephoto region, the retaining frame 140 rotates together with the cam tube 108 and the inner cam tube 138 due to the engagement between the follower 140a and the upper section of the transmission cam 145a.

When the magnification-changing operation is performed in the wide-angle region, the retaining frame 140 rotates in a direction opposite to the rotational direction of the cam tube 108 and the inner cam tube 138 due to the engagement between the follower 140a and the lower section of the transmission cam 145a. Accordingly, the relative rotational speed of the retaining frame 140 with respect to the cam tube 108 and the inner cam tube 138, that is, the rotational speed of the follower 140a in the focus cam 138a, is higher than that in the magnification-changing operation in the telephoto region.

When the magnification-changing operation is performed in the middle region, the retaining frame 140 rotates in the same direction as the rotational direction of the cam tube 108 and the inner cam tube 138 due to the engagement between the follower 140a and the middle section of the transmission cam 145a. Accordingly, the relative rotational speed of the retaining frame 140 with respect to the cam tube 108 and the inner cam tube 138, that is, the rotational speed of the follower 140a in the focus cam 138a, is lower than that in the magnification-changing operation in the telephoto region.

With reference to FIG. 1, a distance scale 141 rotates together with the focus key 127, which is the output of the focusing unit 125, and indicates the focus position by means of the scale window 104. A main circuit board 142 is electrically connected to the focusing unit 125, the electromagnetic diaphragm unit 117, the shake correction unit 111, the gyroscope circuit board 129, and the encoder flexible circuit board 130 directly or through a flexible circuit board in order to perform various control operations.

A contact block 143 for providing communication with the camera body 2 and supplying the electric power is attached to the mount 101 with screws and is connected to the main circuit board 142 through a flexible circuit board. A back cover 144 is resiliently coupled to the mount 101 so as to block harmful light.

The structure of the lens apparatus (optical apparatus) 1 according to the present embodiment is described above. Next, the operations of the lens apparatus 1 will be described.

The transmission tube 145 is rotated with the focus key 127 by the driving force of the vibration motor in the autofocus mode of the focusing operation and by the operating force of rotating the manual focusing ring 126 in the manual mode of the focus adjustment operation. When the transmission tube 145 rotates, the follower 140a of the retaining frame 140 moves in accordance with the movement of the intersection point between the focus cam 138a in the inner cam tube 138 and the transmission cam 145a in the transmission tube 145. Accordingly, the second lens unit L2 rotates and moves along the optical axis.

In the magnification-changing operation, when the zoom operation ring 132 rotates, the cam tube 108 is rotated by the zoom key 133. When the cam tube 108 rotates, the intersection points between the guide grooves 107a and 107b (FIG. 2) in the guide tube 107 and the zoom cams 108a, 108b, 108c, and 108d in the cam tube 108 move. As the intersection points move, the retaining frames 109 and 110, the shake correction unit 111, and the rectilinear tube 112 move along the optical axis. Therefore, the first lens unit L1, the third lens unit L3, the fourth lens unit L4, the fifth lens unit L5, and the sixth lens unit L6 (integrated with the lens unit L3) move along the optical axis.

In addition, simultaneously, the second lens unit L2 moves along the optical axis by an amount corresponding to the sum of the amount of movement of the inner cam tube 138 along the optical axis, which corresponds to the movement of the intersection point between the zoom correction cam 107c in the guide tube 107 and the rectilinear groove 108e in the cam tube 108, and the amount of movement of the follower 140a of the retaining frame 140, which is due to the rotation of the inner cam tube 138 and which corresponds to the movement of the intersection point between the focus cam 138a in the inner cam tube 138 and the transmission cam 145a in the transmission tube 145. Accordingly, focus correction is performed in accordance with the change in the focal length.

In the present embodiment, the amount of movement of the focusing lens caused by the change in the focal length of the inner focus system is smoothly corrected by the transmission tube 145 that is movable along the optical axis. Therefore, the focusing lens unit including the second lens unit L2 and the retaining frame 140 moves smoothly. This will be described in more detail below.

In the shake correction operation, the shake correction unit is controlled in accordance with the outputs of the vibration gyroscopes 128 and the encoder flexible circuit board 130. Accordingly, the fifth lens unit L5 can be moved along a plane that is substantially perpendicular to the optical axis in a such a direction as to cancel the shift of an image on a film surface caused by the vibration.

Figure 3:
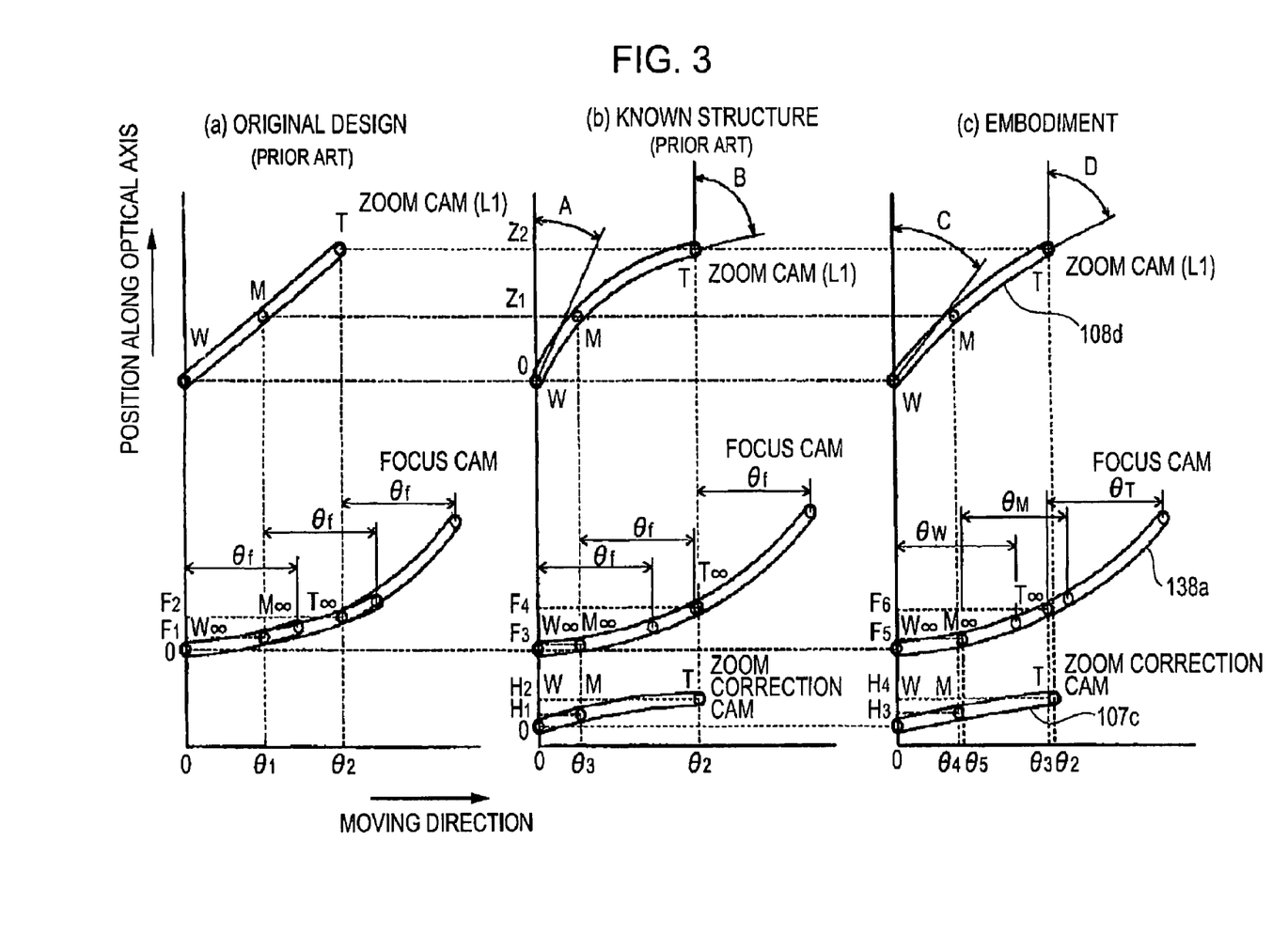
FIG. 3 is a diagram illustrating the differences between focus cam optimization according to the embodiment of the present invention and that of the known structure.

Next, the optimization of the focus cam 138a in the lens apparatus 1 according to the present embodiment will be described in detail below with reference to FIG. 3. In FIG. 3, (a) shows the state of optical design, (b) shows the state of focus cam optimization in the known structure (Japanese Patent No. 2561350), and (c) shows the state of focus cam optimization according to the present embodiment.

In each state shown in FIG. 3, the horizontal axis shows the rotational position of each cam wherein the corresponding follower moves in the cam from the wide-angle position (W) to the telephoto position (T) through the middle position (M) as the cam rotates from left to right in the figure, and the vertical axis shows the position of the follower along the optical axis.

In FIG. 3, a zoom cam, a focus cam, and a zoom correction cam shown in (a) and (b) correspond to the zoom cam 108d, the focus cam 138a, and the zoom correction cam 107c, respectively, according to the present embodiment shown in (c). The state in which the object distance is ∞ at the wide-angle position W is defined as the reference (0) of the rotational position of each cam and the position of each follower along the optical axis.

In the original optical design shown in (a), the zoom cam of the first lens unit L1 included in a variator lens unit is expressed as a straight line having a constant lead and passing thorough a point where the rotational position is θ1 and the position along the optical axis is Z1 at the position M and a point where the rotational position is θ2 and the position along the optical axis is Z2 at the position T.

The focus cam is obtained by arranging curves showing the lens-position trajectories of the second lens unit L2 in the focusing lens unit versus object distance at the positions W, M, and T onto a single curve. The object distance is ∞ at the same rotational positions as those of the zoom cam corresponding to the positions W, M, and T, and is reduced toward the right in the figure (the position along the optical axis is F1 when the object distance is ∞ at the position M and is F2 when the object distance is ∞ at the position T).

In the lens-position curves for the respective focal length regions, when the rotational angle from the angle corresponding to the object distance ∞ is the same in each curve, the corresponding object length is also the same. The rotational angle between the angle corresponding to the object distance ∞ and the angle corresponding to the minimum object distance is θf in each focal length range.

In the original optical design shown in (a), the focus cam cannot be regarded as a single smooth curve. In the state of focus cam optimization in the known structure shown in (b), the lens-movement trajectories of the second lens unit with respect to the rotational angle from the angle corresponding to the object distance ∞ are the same as those in the original optical design shown in (a). The lens positions corresponding to the positions M and T are shifted to make the focus cam a smoother curve. More specifically, the rotational position and the position along the optical axis are set to θ3 and F3, respectively, when the object distance is ∞ at the position M and are set to θ2 and F4, respectively, when the object distance is ∞ at the position T.

Accordingly, also in the zoom cam, the rotational position corresponding to the position M is shifted to θ3 without changing the position along the optical axis, and the zoom cam and the focus cam are rotated together in the magnification-changing operation. Therefore, the shift of the movement trajectory of the focusing lens from that of the original design at each focal length is sufficiently small.

The zoom correction cam is determined as explained below. As described above, the second lens unit L2 moves by an amount corresponding to the sum of the amount of movement of the focus cam caused by the zoom correction cam and the amount movement of the second lens unit L2 caused by the focus cam.

Therefore, if the amount of movement of the second lens unit L2 in the magnification-changing operation is Z'1 when the object distance is ∞ at the position M and is Z'2 when the object distance is ∞ at the position T (the lens position when the object distance is ∞ at the position M is the reference), the zoom correction cam is set as a curve that passes though a point corresponding to H1=Z'1−F3 at the position M and a point corresponding to H2=Z'2−F4 at the position T. Accordingly, not only the change in focus at the object distance ∞ but also the difference in the amount of lens movement due to the difference in focal length can be mechanically corrected for all object distances. This is because at the relative rotational speed in the usable region of the focus cam in each focal length, if the rotational angle from the angle corresponding to the object distance ∞ is the same, the object distance is also the same.

In this manner, the amount of movement of the focusing lens associated with the change in the focal length is automatically corrected in the known structure. However, as described above, in high-magnification zoom lenses (zoom lenses with a magnification of 5× or more), the amount of shift of the rotational position required at the position M in the zoom cam is large. Therefore, the inclination of the cam largely differs between the positions W and T.

This causes an operability problem that the operating torque increases or rapidly changes in the magnification-changing operation or a problem that a change in focus that is out of the allowable range must be tolerated in the magnification-changing operation in order to avoid the problem of operability.

In comparison, in the focus cam optimization according to the present embodiment shown in (c), the rotational position of the zoom cam at the position M is set to θ4 (>θ3). In addition, a mechanism (engagement mechanism of the follower 140a and the speed-changing cam 145a having a non-straight cam shape) is provided for changing the rotational speed of the follower 140a in the focus cam 138a in accordance with the position of the focusing lens unit including the second lens unit L2 along the optical axis (i.e., in accordance with the focal length) during the magnification-changing operation. Accordingly, the use position and the use range of the focus cam 138a at each focal length are corrected.

Accordingly, similar to the known structure, the shift of the movement trajectory of the focusing lens from that of the original design at each focal length is sufficiently small. In addition, the difference in the inclination of the zoom cam 108d between the positions W and T is reduced (D−C<B−A). More specifically, the shape of the focus cam 138a is set such that the rotational position and the position along the optical axis are θ5 and F5, respectively, when the object distance is ∞ at the position M and are θ6 and F6, respectively, when the object distance is ∞ at the position T. Accordingly, the zoom correction cam 107c is set as a curve that passes through a point corresponding to H3=Z'1−F5 at the position M and a point corresponding to H4=Z'2−F6 at the position T (the rotational positions are the same as those in the zoom cam). Accordingly, not only the change in focus at the object distance ∞ but also the difference in the amount of lens movement due to the difference in focal length can be mechanically corrected for all object distances.

More specifically, at the relative rotational speed in the usable region of the focus cam in each focal length, if the rotational angle of the focus key from the angle corresponding to the object distance ∞ is the same, the object distance is also the same.

In the present embodiment, the speed-changing mechanism (transmission tube 145) is provided for changing the rotational speed of the follower 140a in the focus cam 138a in accordance with the focal length. The speed-changing mechanism (transmission tube 145) moves together with the inner cam tube 138 having the focus cam 138a along the optical axis in the magnification-changing operation, and rotates around the optical axis in the focus adjustment operation.

Accordingly, unlike the known structure (the structure in which a component corresponding to the focus key 127 in the present embodiment, that is, a component which does not move along the optical axis, is used in place of the mechanism for changing the rotational speed of the follower 140a in the focus cam 138a), even when the movement trajectory of the focusing lens unit (second lens unit L2) along the optical axis in the magnification-changing operation passes through the same position along the optical axis a plurality of times, it is not necessary to set the moving speed of the engagement position of the focus cam 138a and the follower 140a to be equal at such positions.

Therefore, the moving speed of the engagement position of the inner cam tube 138 and the follower 140a provided in the focusing lens unit can be changed in accordance with the focal length. Accordingly, the focusing lens unit can be smoothly moved in the magnification-changing operation, and the engagement position and the engagement range of the inner cam tube 138 and the follower 140a of the focusing lens unit at each focal length can be adequately corrected. Thus, an optical apparatus that provides good operability in the magnification-changing operation while sufficiently reducing the change in focus during the magnification-changing operation can be obtained.

In other words, the speed-changing mechanism 145, which moves along the optical axis in the magnification-changing operation, changes at least one of the rotational speed and the rotational direction of the focusing lens unit with respect to the focus cam 138a in accordance with the focal length, thereby correcting the engagement position and the engagement range of the focus cam 138a and the follower 140a. Accordingly, the influence of optimization of the focus cam 138a on the movement trajectory of the zoom optical system (variator lens unit), that is, the shape of the variator cam, can be reduced.

By inclining the speed-changing cam 145a with respect to the optical axis, the rotational speed of the follower 140a in the focus cam 138a is changed in accordance with the position of the focusing lens unit along the optical axis (i.e., focal length) so as to satisfy the following expression:

$$\theta W > \theta T > \theta M.$$

Accordingly, the influence of the focus cam optimization on the movement trajectory of the zoom cam is reduced, the influence being attributable to the characteristics of high-magnification zoom lenses (zoom lenses with a magnification of 5× or more) that when a smooth focus cam based on the position T in (a) of FIG. 3 is considered, the amount of movement becomes excessively large at the position M and excessively small at the position W.

More specifically, the speed-changing mechanism 145 changes the relative rotational speed such that (relative rotational speed Vw in the wide-angle region)>(relative rotational speed Vt in the telephoto region)>(relative rotational speed Vm in the middle region) is satisfied. Accordingly, the shift of the movement trajectory of the focusing lens from that of the original design is set small. In addition, the difference in inclination of the variator cam with respect to the optical axis between the wide-angle region and the telephoto region can be reduced. Furthermore, rapid change in the operating torque between the wide-angle region and the telephoto region can also be reduced.

The optical apparatus includes the focus key (focus driving member) 127 having the key groove 127a that engages with the key follower 145b included in the speed-changing mechanism 145. In the focus adjustment operation, the focus key 127 rotates the speed-changing mechanism 145 with respect to the inner cam tube 138, which does not rotate, due to the engagement between the key groove 127a and the key follower 145b. Accordingly, the focusing lens unit is driven along the optical axis. In addition, the speed-changing mechanism 145 includes a non-straight cam in which at least a portion thereof that engages with the follower 140a provided in the focusing lens unit is not parallel to the optical axis. Therefore, a simple speed-changing mechanism 145 can be easily obtained.

In addition, the rectilinear groove 108e formed in the cam tube 108 having the zoom cam and the zoom correction cam 107c form the moving mechanism for correcting the difference between the focus movement trajectory of the focusing lens unit and the zoom movement trajectory. Accordingly, the influence of the focus cam optimization on the movement trajectory of the zoom cam can be reduced without using a complex mechanism.

In the above-described embodiment, the case in which the shooting lens system having a six unit structure is used is explained. However, the structure of the present embodiment can also be applied to other types of lens systems.

In addition, in the above-described embodiment, the movement of the use position of the focus cam 138a when the focal length is changed from the wide-angle end to the telephoto end is made the same as that when the object distance is changed from the infinity distance to the minimum object distance. However, the present invention is not limited to this, and can be applied to a combination of opposed directions.

In addition, the present embodiment can also be applied to the case in which the cam tube 108 is configured to move along the same trajectory as that of the inner cam tube 138 while rotating, and the cam tube 108 and the inner cam tube 138 are combined together into a single cam tube.

In addition, although an interchangeable lens for a single-lens reflex camera is explained above, the present embodiment can also be applied to other optical apparatuses such as lens apparatuses (lens barrels) other than above-described lens apparatus, silver-salt cameras with integrated lenses, digital cameras, and video cameras.

According to the above-described embodiment, the speed-changing mechanism that moves along the optical axis in the magnification-changing operation changes the moving speed of the engagement position of the first cam member and the follower formed in the focusing lens unit in accordance with the focal length. Accordingly, the focusing lens unit can be smoothly moved in the magnification-changing operation, and the engagement position and the engagement range of the first cam member and the follower of the focusing lens unit at each focal length can be smoothly and adequately corrected.

Accordingly, an optical apparatus that provides good operability in the magnification-changing operation while sufficiently reducing the change in focus during the magnification-changing operation can be obtained.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2004-300378 filed Oct. 14, 2004, which is hereby incorporated by reference herein in its entirety.

What is claimed is:

1. An optical apparatus comprising:
a zoom optical system including a focusing lens unit;
a first cam member that rotates around the optical axis and moves along the optical axis in a magnification-changing operation, the first cam member including a focus cam portion for driving the focusing lens unit; and
a speed-changing mechanism that changes the relative rotational speed between the focusing lens unit and the first cam member in accordance with a change of the focal length of the zoom optical system in the magnification-changing operation,
wherein all parts of the speed-changing mechanism move along the optical axis in the magnification-changing operation, and
wherein the speed-changing mechanism includes a transmission member that is rotatable around the optical axis with respect to the first cam member and that includes a speed-changing cam portion for changing at least one of the rotational speed and the rotational direction of the focusing lens unit.

2. The optical apparatus according to claim 1, wherein the speed-changing mechanism changes the relative rotational speed between the focusing lens unit and the first cam member in a focus adjustment operation.

3. The optical apparatus according to claim 1, wherein the speed-changing mechanism moves along the optical axis together with the first cam member.

4. The optical apparatus according to claim 1, wherein the zoom optical system further includes a variator lens unit, and wherein the optical apparatus further comprises a second cam member that rotates around the optical axis in association with the first cam member in the magnification-changing operation and that includes a variator cam portion for driving the variator lens unit along the optical axis.

5. The optical apparatus according to claim 1, wherein the zoom optical system further includes a variator lens unit, and the first cam member further includes a variator cam portion for driving the variator lens unit along the optical axis.

6. The optical apparatus according to claim 1, wherein the speed-changing mechanism changes at least one of the rotational speed and the rotational direction of the focusing lens unit with respect to the first cam member in accordance with the focal length.

7. The optical apparatus according to claim 1, wherein the focusing lens unit includes a cam follower that engages with the focus cam portion and the speed-changing cam portion.

8. The optical apparatus according to claim 1, wherein the following expression is satisfied:

$Vw>Vt>Vm$ where Vw is the relative rotational speed in the wide-angle region, Vt is the relative rotational speed in the telephoto region, and Vm the relative rotational speed in the middle region.

9. The optical apparatus according to claim 1, wherein in a focus adjustment operation of the zoom optical system, the speed-changing mechanism is rotated with respect to the first cam member that does not rotate and drives the focusing lens unit along the optical axis.

* * * * *